United States Patent
Zellak

(10) Patent No.: US 6,595,696 B1
(45) Date of Patent: Jul. 22, 2003

(54) INTERNAL SHUTTER FOR OPTICAL ADAPTERS

(75) Inventor: Darren J. Zellak, Aurora, IL (US)

(73) Assignee: Amphenol Corporation, Wallingford, CT (US)

(*) Notice: Subject to any disclaimer, the term of this patent is extended or adjusted under 35 U.S.C. 154(b) by 102 days.

(21) Appl. No.: 09/805,198

(22) Filed: Mar. 14, 2001

(51) Int. Cl.⁷ .................................... G02B 6/36
(52) U.S. Cl. ..................... 385/72; 385/78; 439/138
(58) Field of Search .................... 385/72, 78, 88, 385/134; 439/138

(56) References Cited

U.S. PATENT DOCUMENTS

| | | | |
|---|---|---|---|
| 4,277,135 A | 7/1981 | Schrott et al. ............ | 350/96.21 |
| 4,557,554 A | 12/1985 | Blanc ........................ | 350/96.2 |
| 4,611,887 A | 9/1986 | Glover et al. ............. | 350/96.21 |
| 4,640,575 A | 2/1987 | Dumas ...................... | 350/96.2 |
| 4,673,242 A | 6/1987 | Logan et al. .............. | 350/96.2 |
| 4,712,861 A | 12/1987 | Lukas et al. .............. | 350/96.21 |
| 4,767,179 A | 8/1988 | Sampson et al. .......... | 350/96.2 |
| 4,779,950 A | 10/1988 | Williams ................... | 350/96.21 |
| 4,986,626 A | 1/1991 | Bossard ..................... | 350/96.2 |
| 5,016,968 A | 5/1991 | Hammond et al. ......... | 350/96.2 |
| 5,052,775 A | 10/1991 | Bossard et al. ............ | 385/76 |
| 5,104,242 A | 4/1992 | Ishikawa .................... | 385/53 |
| 5,123,071 A | 6/1992 | Mulholland et al. ....... | 385/53 |
| 5,142,597 A | 8/1992 | Mulholland et al. ....... | 385/56 |
| 5,166,995 A | 11/1992 | Briggs et al. .............. | 385/58 |
| 5,202,949 A | 4/1993 | Hileman et al. ............ | 385/134 |
| 5,317,663 A | 5/1994 | Beard et al. ............... | 385/70 |
| 5,333,221 A | 7/1994 | Briggs et al. .............. | 385/55 |
| 5,335,301 A | 8/1994 | Newman et al. ........... | 385/75 |
| 5,337,385 A | 8/1994 | Baderschneider et al. . | 385/59 |
| 5,348,487 A | 9/1994 | Marazzi et al. ............ | 439/138 |
| 5,363,460 A | 11/1994 | Marazzi et al. ............ | 385/70 |
| 5,373,574 A | 12/1994 | Marazzi ..................... | 385/78 |
| 5,420,951 A | 5/1995 | Marazzi et al. ............ | 385/75 |
| 5,436,987 A | 7/1995 | Saito et al. ................. | 385/16 |
| 5,506,922 A | 4/1996 | Grois et al. ................ | 385/75 |
| 5,570,445 A | 10/1996 | Chou et al. ................ | 385/92 |
| 5,577,146 A | 11/1996 | Musk ......................... | 385/92 |
| 5,692,080 A | 11/1997 | Lu ............................. | 385/60 |
| 5,708,745 A | 1/1998 | Yamaji et al. ............. | 385/92 |
| 5,716,224 A | 2/1998 | Masuda et al. ............ | 439/138 |
| 5,825,955 A | 10/1998 | Ernst et al. ................ | 385/79 |
| 5,845,036 A | 12/1998 | De Marchi ................ | 385/139 |
| 5,883,995 A | 3/1999 | Lu ............................. | 385/60 |
| 5,956,444 A | 9/1999 | Duda et al. ................ | 385/53 |
| 5,964,600 A | 10/1999 | Miles et al. ............... | 439/140 |
| 5,971,625 A | 10/1999 | Lu ............................. | 385/60 |
| 5,984,531 A | 11/1999 | Lu ............................. | 385/60 |
| 6,004,043 A | 12/1999 | Abendschein et al. ..... | 385/76 |
| 6,041,155 A | * 3/2000 | Anderson et al. .......... | 385/139 |

(List continued on next page.)

OTHER PUBLICATIONS

Hirose Duplex Adapter Press Release dated Feb. 1, 1999.

Primary Examiner—Michael C. Zarroli
(74) Attorney, Agent, or Firm—Blank Rome LLP

(57) ABSTRACT

A beam-blocking safety shutter (100) is mounted in a fiber-optic adapter housing (500) that mates with a standard fiber-optic male connector of the type with a fiber-containing ferrule protruding from a forward end. The shutter is rotatably mounted in the insertion passage on a shaft (300) and held in the light-blocking position by a closing spring (200). The shutter has two shoulders (130) extending forward from a backplate portion (120) of the shutter. The shoulders, placed to either side of the ferrule's path in the insertion passage, hit the body of the inserted connector and take the force that opens the shutter, so that the ferrule is protected from contact. The shoulders preferably are deeper than the distance the ferrule extends from the connector body. The ends of the shaft protrude from the sides of the shutter. The protruding ends are slid into dead-end grooves in the housing and held there by a U-shaped clip forced into the grooves.

19 Claims, 3 Drawing Sheets

U.S. PATENT DOCUMENTS

| | | | |
|---|---|---|---|
| 6,076,973 A | 6/2000 | Lu | 385/60 |
| 6,081,647 A | 6/2000 | Roth et al. | 385/139 |
| 6,108,482 A | 8/2000 | Roth | 385/139 |
| 6,142,676 A | 11/2000 | Lu | 385/60 |
| 6,287,133 B1 * | 9/2001 | Yang | 439/138 |
| 6,347,954 B1 * | 2/2002 | Jones et al. | 439/358 |
| 6,508,593 B1 * | 1/2003 | Farnsworth et al. | 385/55 |
| 2001/0048790 A1 * | 12/2001 | Burkholder et al. | 385/78 |
| 2002/0150342 A1 | 10/2002 | Kiani | 385/53 |

* cited by examiner

INTERNAL SHUTTER FOR OPTICAL ADAPTERS

BACKGROUND OF THE INVENTION

1. Field of the Invention

The present invention relates to a light-blocking shutter in fiber optic connector or adapter that prevents emission of laser light when the connector is open (i.e., when no mating connector is inserted). This prevents eye damage if a person should look into the open end of the connector that is carrying an optical signal. More specifically, the invention relates to light-blocking shutters that automatically block the opening through which the light signal is transmitted when a mating connector is removed and automatically open when the mating connector is inserted.

2. Description of the Prior Art

FIG. 3, labeled "Prior Art," shows a typical connector tip with a ferrule F, having centrally-located optical fiber (or fibers) O terminating at its surface, extending from the end of a connector body B1. (B2 is an outer body that slides on B1.) Of course, damage to the end of the fiber itself(dirt or scratches) can also cause severe scattering of the light beam and insertion loss.

A number of patents disclose fiber-optic connectors with spring-loaded shutters that are pushed inward by the insertion of a male connector.

Abendschein et al 6,004, 043 discloses a spring-loaded shutter door that is disposed at an angle O inwardly into the receptacle and is pushed out of the way by the inserted male connector (column 3, lines 50–54). The inserted male connector contacts the shutter near the spring-loaded hinge, which requires a greater force than if the connector contacted the shutter at a distance from the spring-loaded hinge.

U.S. Pat. No. 6,142,676 to Lu shows an internal beam stop, door 38. Door 38 is biased by a spring 39 and limited by stop posts 40 (col. 4, lines 6–21). The door is angled at about 20° off the transverse. As seen in FIGS. 23–27, the door 38 is first pushed inward by the cover 66 and then by a prong 76 (FIG. 24). Once the door 38 is held up out of the way, continued insertion operates a cam mechanism that raises a cover 66 (FIG. 26) so that it comes to rest against the raised door 38 (FIG. 27).

It is noted that slanting the shutter does not actually increase the leverage and does nothing to solve the leverage problem discussed above, as long as the engagement is laterally near to the hinge. This is because the torque required to open the shutter is the product of the force and the distance from the line of the force to the hinge. The line of force extends parallel to the motion of the male connector.

Roth, U.S. Pat. No. 6,108,482, states its object as preventing damage to the tip of a male optical-fiber connector (column 1, line 61 to column 2, line 6). Roth '482 shows a spring-loaded shutter 28 in which the shutter surface 42 is divided into a recessed area 44 and a surrounding ledge 46 having a raised surface 42 (column 3, lines 47–49 and 59–61). The male connector that pushes open the shutter has a projecting optic fiber ferrule 54 with a "front mating face" 54a that "engages outer surface 42 of shutter 28 and automatically opens the shutter" (column 4, lines 11–14). The shutter's recess 44 is intended to protect the central area of the mating face 54, where the fiber termination is located: "Recessed area 44 has a depth such that the polished ends of the optical fibers are protected" (column 4, line 17). The fiber termination, but not the ferrule itself, is protected.

Roth's structure has several disadvantages. When the ferrule hits the shutter it is subjected to forces that would better be taken by the shoulder 56 of the connector body surrounding it. Roth actually teaches against opening the shutter by pushing it with anything except for the ferrule, stating that the recess "should be designed with a depth slightly less than the distance the ferrule projects from the fiber optic connector" (column 3, lines 53–55; see also column 2, lines 32–34).

In summary, the prior art does not disclose any fiber-optic light beam shutter that is swung open by a force exerted far from the hinge line, so as to prevent high loading and eventual damage to the hinge. Neither does it disclose a shutter that uses a simple, inexpensive, and foolproof structure to insure that the delicate tip of the inserted connector does not bang against the shutter, risking damage.

SUMMARY OF THE INVENTION

The present invention relates to a female or receptacle connector or adapter with a passage into which is inserted a mating male connector or plug, such as for example the SC connector shown in FIG. 3, in such a way that the fiber optic end O is aligned with and juxtaposed to another fiber end very precisely, so that light is transferred into (or from) the fiber end O. The adapter holds the other fiber. When that other fiber is active, light is emitted from its terminus and will shine out of the passage when the male connector is not inserted in the adapter passage. Since the light used in fiber optic communications is generated by lasers, people should not be exposed to the light. The recent trend toward more powerful signal lasers has made fiber optics more dangerous than they were previously.

The invention provides a shutter that is hinged on one side of the adapter passage. It is pushed out of the way by the male connector (e.g., that of FIG. 3) when the male connector is inserted. The shutter is spring-loaded so as to remain in a closed position until pushed open, and to spring back when the male connector is withdrawn.

Preferably, the shutter is made by chemical etching followed by forming. It may also be made by stamping. A preferred material is stainless steel, but plastic with 0% light transmission, or with a metallic coating, is also suitable. Any suitable materials and manufactures are within the scope of the invention.

The shutter includes a light-blocking panel portion and a shoulder portion. The shoulder portion is the first part to contact the male connector, and is placed so that only the shoulder of the body of the SC male connector, and not the ferrule, touches it. By taking all of the insertion force, the shoulder protects the delicate extending tip of the male connector (e.g., the ferrule F of FIG. 3).

The shoulder height in the longitudinal direction (the direction that is parallel to the run of the optical fiber) is shown as D in FIG. 6. This height or distance D should be greater than the distance the ferrule projects from the shoulder of the connector in the same longitudinal direction; that distance is shown as d in FIGS. 3 and 6. D being greater than d insures that the ferrule tip never touches the more interior parts of the shutter when the shutter shoulder is against the connector body.

To further protect the ferrule, the leading edge of the shoulder (the edge foremost in the longitudinal direction, that first contacts the inserted connector body) is preferably set back from the front surface of the adapter body by a longitudinal-depth distance greater than the shoulder height D (and therefore also greater than the longitudinal ferrule extension d). When this set-back is greater than d, the tip of the ferrule F will not touch the leading edge of the shoulder if the connector is inserted off-center.

The setback or longitudinal-depth distance not only helps to prevent ferrule contact, it also makes it more difficult to open the shutter with a finger, pencil, or the like because the shoulder is recessed into the adapter body.

It is also preferred that in the transverse direction (the direction perpendicular to the longitudinal direction), the separation between the side of the ferrule and the adjacent outside of the connector body exceeds the transverse distance from the side of the adapter body aperture to the top of the shoulder; that is, the ferrule is "above" the shoulder. Such a relationship insures that when the outside of the male connector body is against the inside of the passage aperture, the ferrule does not touch the shoulder.

The connector housing includes a space into which the shutter is entirely recessed when the male connector is fully inserted.

Preferably there are two shoulders, one on either side of a central space, so that the shutter is generally C-shaped in cross section; the extending tip of male connector moves into the central space during insertion, while the ferrule-holder shoulder on either side pushes the respective shoulder. The two shoulders balance the force and eliminate a torque on the hinge that is perpendicular to the axis of the hinge.

The shoulders increase the mechanical advantage of the male connector in swinging the shutter out of the way. Besides extending along the insertion axis to protect the connector tip, the shoulders also extend away from the hinge line in a direction that is transverse to the insertion direction, i.e., toward the middle of the insertion passage. This increases the torque acting on the shutter relative to the hinge line, and makes for faster and easier shutter opening and decreased force on the shutter hinges.

DETAILED DESCRIPTION OF THE INVENTION

Figure 3:
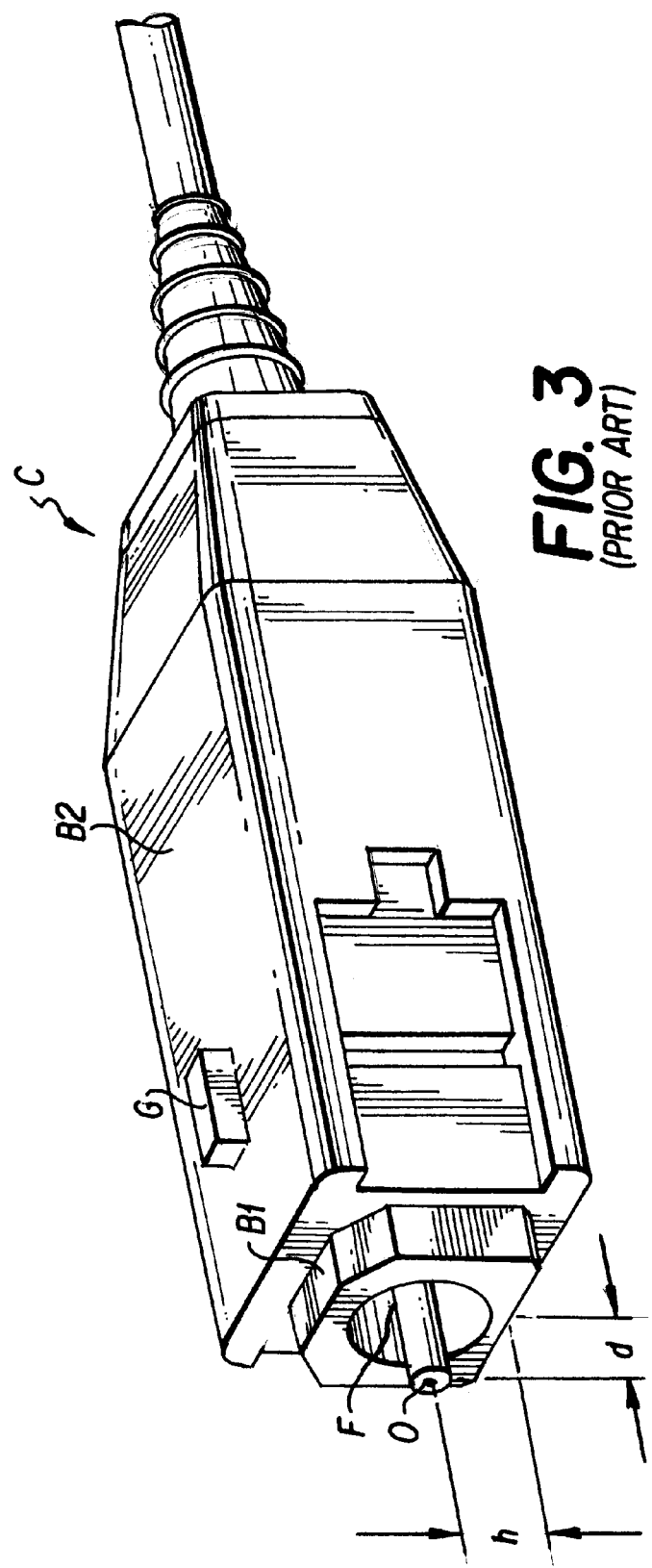
FIG. 3, labeled "Prior Art," is a perspective view of a male SC connector.

FIG. 3, as discussed above, shows an exemplary male SC fiber-optic connector C that mates with the adapter of the invention. (The invention is not limited to the SC type, but is also adaptable to LC and MTP connectors and other types.) It fits into a passage 560 of an adapter housing 500 of the invention (seen in FIGS. 4–6), as discussed below. It includes a ferrule F holding the optical fiber O, an inner body B1 holding the ferrule F, and an outer body B2 which slides longitudinally on the inner body B1 as part of the latch mechanism, which is conventional and shall not be discussed.

The ferrule F protrudes a distance d from the extreme end of the body B1, in the longitudinal direction.

Figure 1:
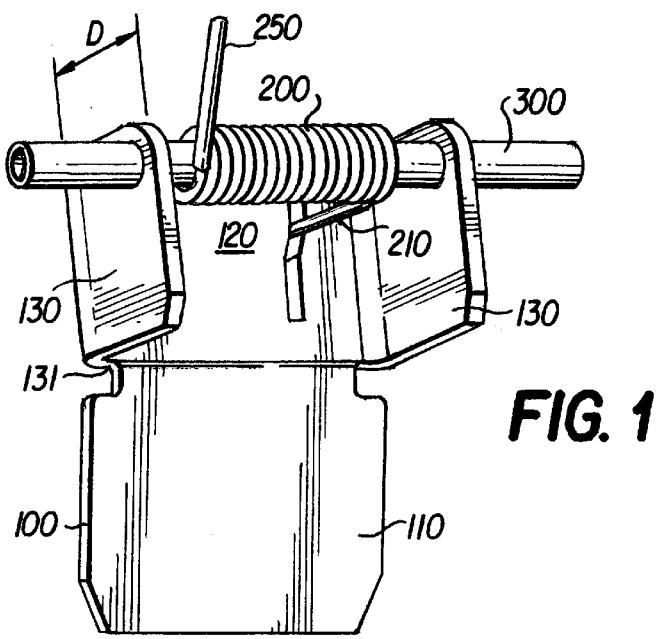
FIG. 1 is a perspective view of a shutter of the present invention.

FIG. 1 shows a shutter 100 assembled to a shaft 300 and a spring 200. The shutter is preferably made of a material that is 0% transmissive, e.g., stainless steel about one millimeter thick by chemical etching and forming the sheet metal into shape. The main body of the shutter 100 is U-shaped, with a back plate 120 bordered by two shoulders 130 and one baffle 110. In the preferred and illustrated embodiment, the baffle 110 and each shoulder 130 is a bent portion of the original flat backplate stamping. The baffle 110 is bent slightly from the plane of the back plate 120, which tends to avoid back-reflection into the adjacent fiber (not shown) and also puts the baffle 110 farther from the ferrule F, as is explained below. To ease the bending of the baffle, two notches 131 may be provided. The shoulders 130 each include a hole 133 (labeled in FIG. 2 where the holes are visible) through which is inserted the shaft 300. Mounted on the shaft 300 between the shoulders 130 is the spring 200, preferably coiling about the shaft 300 and with extensions 250 and 210; the latter is L-shaped, and the outermost straight portion is seen in FIG. 2 while the inner straight portion is visible in FIG. 1.

From the edge of the shoulder to the inside surface of the backplate 120 defines a depth denoted as D preferably taken in a direction generally perpendicular to the backplate.

Figure 2:
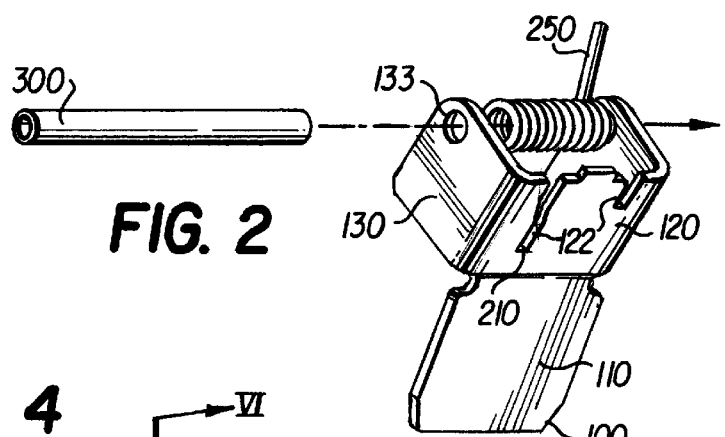
FIG. 2 is a partially-exploded, perspective view of the shutter of FIG. 1.

FIG. 2 shows the first step of assembly. The shaft 300 is inserted through the coil of the spring 200 and the two holes 133. The spring extension 210 is held in a spring-holding slot 122 cut in the backplate 120.

Figure 4:
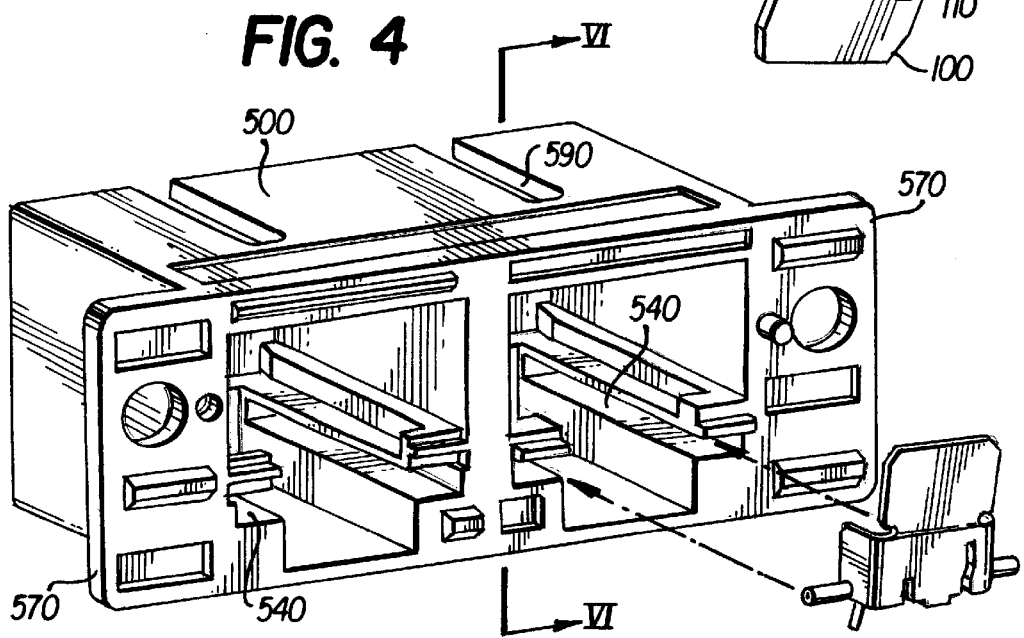
FIG. 4 is a partially-exploded, perspective view of an adapter body and shutter.

The shutter assembly of FIG. 1 is then slid into the housing 500, with the protruding ends of the shaft 300 sliding along grooves 540 in the walls of the housing 500 just below the insertion passage 560. This is shown in FIG. 4. The grooves 540 dead-end near the front end of the housing. (The front end is the end into which the male connector C is inserted; it is on the left in FIG. 6 and toward the upper left in FIGS. 4 and 5.) To hold the ends of the shaft 300 against the dead ends of the two grooves 540, a U-shaped holding clip 400 is used.

Figure 5:
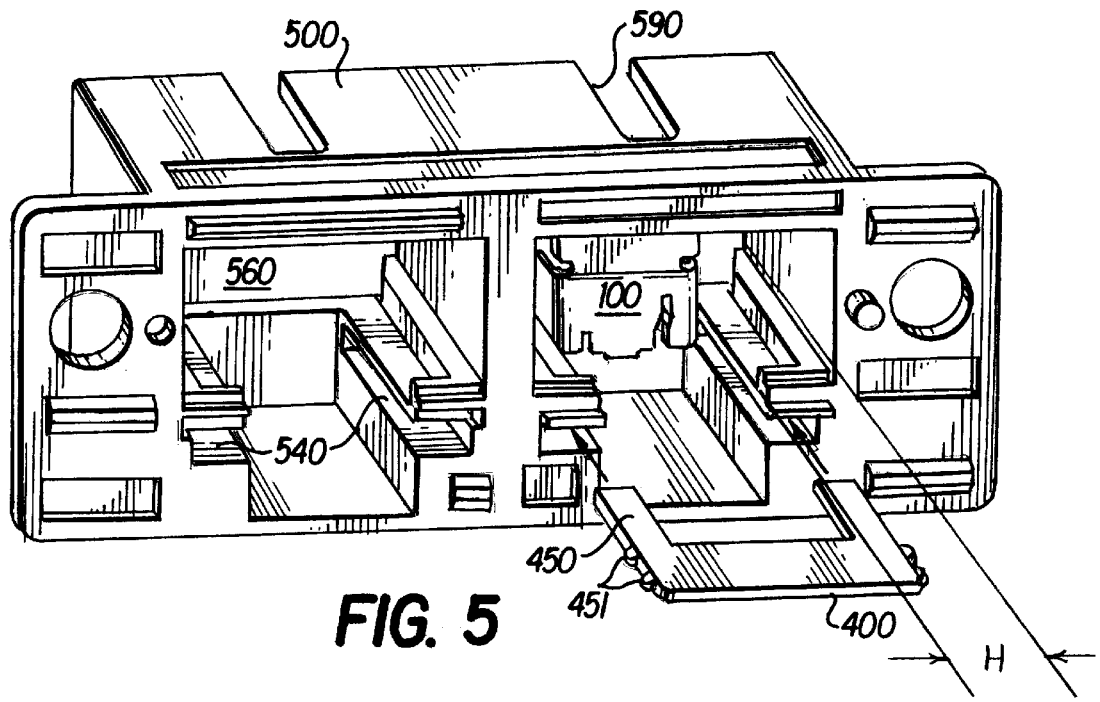
FIG. 5 is a partially-exploded, perspective view of an adapter body and holding clip.

FIG. 5 shows the holding clip 400, which is also preferably made of stainless steel sheet metal. The holding clip 400 has two arms 450 that are inserted into the grooves 540 after the shutter assembly is inserted, as shown in FIG. 5. Barbs 451 along the sides of the arms 450 help to hold the clip 400 in the grooves 540 by pressing into the plastic of which the housing 500 is preferably made. The holding clip 400 is preferably shaped such that it can be pressed in fully, by hand, to a position in which the rear end (the bottom of the U) is flush with the rear surface of the housing 500, and the tips of the U at the front end are holding the shaft 300 against the dead-ends of the grooves 540. The shutter assembly is thereby located in its proper position. To finally lock the holding clip in position, the invention contemplates sonic welding onto the rear surface of the housing 500 of another housing 500', as discussed below.

Figure 6:
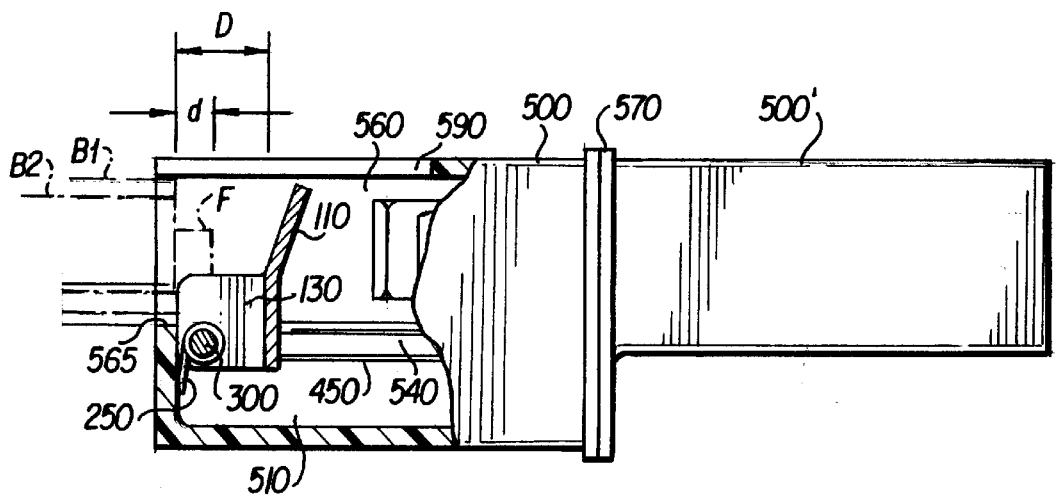
FIG. 6 is a partial cross-sectional view along lines VI–VI of FIG. 4 after completion of assembly.

FIG. 6 shows the assembled housing 500 and the other housing 500' welded onto its rear end at flange 570. The result is a bidirectional housing in which four male connectors can be inserted. The inserted male connector C, shown in dashed lines, first connects with the top of the edge of the shoulder 130 and pushes, causing the shutter 100 to rotate as shown by the arrow. As the depth D is greater than the distance d, the ferrule F is disposed in between the two shoulders 130 and does not touch any part of the shutter 100. The shutter rotates through an angle of about 90°, and ends up nested in the space 510 below the insertion passage 560, the passage 560 then being clear for the insertion of the male connector C.

With the type of connector shown in FIG. 3, the outer body B2 is slidable on the inner body B1 and during insertion it might be pushed forward so that the outer body B2 is what drives the shutter 100 to rotate down. In that event, the distance d from the tip of the ferrule F to the end of the inner body B1 is the same as the distance from the tip of the ferrule F to the end of the outer body B2. (The outer body B2 slides backward on withdrawal, which operates an unlatching mechanism, not shown in detail in the drawing.)

If the holding clip 400 is made of strong metal, that increases the strength of the invention because the insertion force of the connector, which is transmitted through the protruding ends of the shaft 300, is brought to bear on a strong metal part instead of the weaker plastic of the housing 500. The force is spread along the grooves 540 and transmitted to the bottom of the U of the holding clip 400, which is long and has a large area to bear against the plastic housing 500'.

To insure that the ferrule does not touch any part of the shutter during any stage of the insertion, the shoulders 130 should not only incorporate the depth D but should also include a placement of the shaft holes 133, and a shape, that keeps the ferrule F away from the backplate 120 and baffle 110 during connector insertion. The geometry of the shutter 100 should not allow the ferrule and shutter to make contact at any time, for a given connector construction (in particular, a standard construction). The spring 200 and shaft 300 are preferably disposed outside of the passage 560 and will not touch the ferrule F either.

The shoulders 130 preferably have a shape that defines a top edge generally perpendicular to the longitudinal axis of the fiber or connector. The top edge may be used to define a height H, in the direction transverse to axis, from the top edge of the shoulder 130 to the side edge of the aperture of the passage 560. This height H should be less than the transverse distance h between the edge of the ferrule F and the underside of the connector body B2, as shown in FIG. 3.

Another transverse distance relationship is that between the initial impact point of the connector body B2 on the shutter 100 and the center line of the shaft 300. This hinge-impact distance should be sufficient that the force on the hinge, i.e. the shaft 300 and holes 133, is not too great and so that the initial rotation of the shutter 100 is rapid, without undue wear or damage, using the generally square shape of the shoulders 130 that is illustrated. Optionally, the upper corner of the shoulder 130 may protrude slightly forward to keep contact there during a longer time.

The spring extension 250 is shown in FIG. 6 to be against the front wall of the space 560. As the shutter 100 rotates clockwise in FIG. 6, the spring 200 is wound up. When the passage 560 is empty, the extension 250 keeps the shutter 100 in the position shown, regardless of orientation in gravity. At the other end of the spring, extension 210 is held in the back of the back plate 120 in slot 122.

The housing 500 preferably includes a slot 590 (also seen in FIGS. 4 and 5) which mates with a guide G on the outer body B2 of the male connector C, seen in FIG. 3.

In the embodiment illustrated, the other housing 500' is identical to the housing 500 but lacks the space 510 and groove 540. Besides the other housing discussed below, any other sort of closure or connection can be provided.

Figure 7:
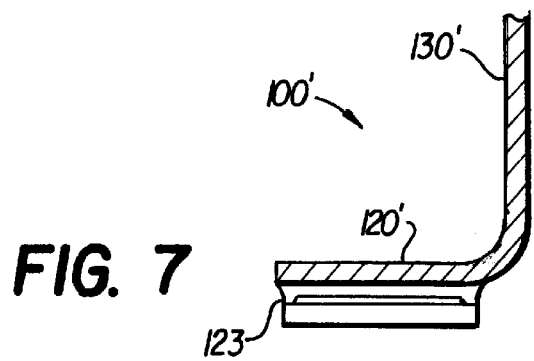
FIG. 7. is a cross-sectional view of an alternative embodiment of the shutter of the present invention.

FIG. 7 shows an alternate shutter 100' embodiment with a single shoulder 130' extending away from the backplate 120'. This is preferably made of stamped and bent sheet metal. A curl 123 creates a tubular mounting structure for the shaft 300 and provides hinging.

The present invention is applicable to multi-fiber connectors such as MTP and MTRJ connectors, which might have 12 fibers in one ferrule. In such multi-fiber connectors one shutter of the same size, or about the same size, as that illustrated will block light from all of the fibers.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A fiber-optic adapter intended to mate with a fiber-optic connector, the fiber-optic connector having a connector body and a fiber-containing ferrule protruding a distance d from a forward end of the connector body; the adapter comprising:

a housing including a passage for accepting the connector body therein during an insertion of the connector in a longitudinal direction into the passage;

a shutter rotatably mounted in the passage; and a spring urging the shutter toward a light-blocking position, from which the shutter is pushed by the insertion of the connector body;

wherein the shutter comprises a shoulder positioned to contact the connector body, the shoulder comprising a depth D in the longitudinal direction;

and wherein $$D > d;$$

whereby the ferrule does not touch the shutter, even when the longitudinal axis of the connector body during insertion in the passage is not substantially coincident with the longitudinal axis of the passage.

2. The adapter according to claim 1, wherein the fiber-optic connector body is selected from the group consisting of SC, LC and MTP connectors.

3. The adapter according to claim 1, wherein the shoulder comprises a shape that prevents any contact of the ferrule and the shutter during a latter stage of the insertion.

4. The adapter according to claim 1, wherein the distance from the top edge of the shoulder to an edge of the passage defines a distance H, and wherein the distance H is less than a transverse distance h between the ferrule F and a side of the connector body.

5. The adapter according to claim 1, wherein the shutter comprises a pair of shoulders.

6. The adapter according to claim 5, wherein each of the pair of shoulders comprises a respective shaft hole, whereby the shutter may be rotatably mounted in the passage on a shaft.

7. The adapter according to claim 6, wherein the shutter comprises a backplate disposed between the two shoulders and the backplate comprises at least one spring-holding slot.

8. The adapter according to claim 1, wherein the shutter comprises a backplate disposed at substantially a right angle to the shoulder.

9. The adapter according to claim 8, comprising a baffle extending from the backplate.

10. The adapter according to claim 9, wherein the baffle makes an angle less than a right angle with the backplate.

11. The adapter according to claim 1, comprising a shaft whereon the shutter is rotatably mounted, wherein the shaft is longer than a width of the shutter whereby ends of the shaft protrude from the shutter, and wherein the housing comprises a pair of grooves wherein the protruding ends of the shaft are held.

12. The adapter according to claim 11, comprising a U-shaped holding clip having two parallel arms inserted into the pair of grooves, whereby the protruding ends of the shaft are held in the grooves.

13. The adapter according to claim 12, wherein the grooves are dead-end grooves, whereby the protruding ends of the shaft are held against dead ends of the grooves by the arms of the holding clip.

14. The adapter according to claim 13, wherein the holding clip comprises metal, whereby the arms support the protruding ends of the shaft against insertion forces.

15. A light-blocking shutter to be mounted in a connector-receiving passage of a fiber-optic adapter, the shutter comprising:

a unitary sheet bent into portions, the portions including a backplate and at least one shoulder extending away from the backplate; and a mounting structure for rotatable mounting of the shutter in the passage about a hinge line parallel to the backplate, wherein the shoulder comprises a shaft hole axially aligned with the hinge line.

16. The shutter according to claim 15, comprising a pair of shoulders, and wherein the two shoulders and the backplate in cross section are generally U-shaped.

17. The shutter according to claim 15, wherein the backplate disposed at substantially a right angle to the shoulder.

18. The adapter according to claim 17, comprising a the baffle extending from the backplate.

19. The adapter according to claim 18, wherein the baffle makes an angle less than a right angle with the backplate.

* * * * *

UNITED STATES PATENT AND TRADEMARK OFFICE
CERTIFICATE OF CORRECTION

PATENT NO. : 6,595,696 B1
APPLICATION NO. : 09/805198
DATED : July 22, 2003
INVENTOR(S) : Darren J. Zellak It is certified that error appears in the above-identified patent and that said Letters Patent is hereby corrected as shown below:

On page 2, under U.S. PATENT DOCUMENTS, after "6,508,593," please add:
--6,076,975     06/2000      Roth ....................................................385/76
6,331,079 B1    12/2001      Grois et al. ..........................................385/53
6,352,375 B1    03/2002      Shimoji et al. ......................................385/92
6,361,218 B1    03/2002      Matasek et al. .....................................385/60
6,371,657 B1    04/2002      Chen et al. ..........................................385/58
6,406,192 B1    06/2002      Chen et al. ..........................................385/56
6,425,694 B1    07/2002      Szilagyi et al. ......................................385/76
6,461,054 B1    10/2002      Iwase ...................................................385/73
6,471,412 B1    10/2002      Belenkiy et al. .....................................385/53
6,481,902 B2    11/2002      Takaoka et al. .....................................385/92--

On page 2, under U.S. PATENT DOCUMENTS, after "2002/0150342 A1," please add:
--2001/0041030 A1     11/2001         Chen et al. .............................385/88
            FOREIGN PATENT DOCUMENTS
Europe           EP 0 788 002 A1        08/1997--.

Col. 1, line 21, change "0" to --O--;
       line 23, change "itself(dirt" to --itself (dirt--;
       line 29, change "6,004, 043" to --6,004,043--;
       line 30, change "0" to --θ--; and
       line 38, change "col." to --column--.

Col. 5, line 48, change "comer" to --corner--.

UNITED STATES PATENT AND TRADEMARK OFFICE
CERTIFICATE OF CORRECTION

PATENT NO. : 6,595,696 B1
APPLICATION NO. : 09/805198
DATED : July 22, 2003
INVENTOR(S) : Darren J. Zellak It is certified that error appears in the above-identified patent and that said Letters Patent is hereby corrected as shown below:

In claim 17, after "backplate" insert --is--.

In claim 18, after "comprising" delete --a--.

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 6,595,696 B1
APPLICATION NO. : 09/805198
DATED : July 22, 2003
INVENTOR(S) : Darren J. Zellak It is certified that error appears in the above-identified patent and that said Letters Patent is hereby corrected as shown below:

On page 2, under U.S. PATENT DOCUMENTS, after "6,508,593," please add:
--6,076,975    06/2000    Roth ..................................................385/76
6,331,079 B1   12/2001    Grois et al. .........................................385/53
6,352,375 B1   03/2002    Shimoji et al. ......................................385/92
6,361,218 B1   03/2002    Matasek et al. .....................................385/60
6,371,657 B1   04/2002    Chen et al. ..........................................385/58
6,406,192 B1   06/2002    Chen et al. ..........................................385/56
6,425,694 B1   07/2002    Szilagyi et al. ......................................385/76
6,461,054 B1   10/2002    Iwase ..................................................385/73
6,471,412 B1   10/2002    Belenkiy et al. ....................................385/53
6,481,902 B2   11/2002    Takaoka et al. .....................................385/92--

On page 2, under U.S. PATENT DOCUMENTS, after "2002/0150342 A1," please add:
--2001/0041030 A1    11/2001    Chen et al. ............................385/88
          FOREIGN PATENT DOCUMENTS
Europe         EP 0 788 002 A1    08/1997--.

Col. 1, line 21, change "0" to --O--;
    line 23, change "itself(dirt" to --itself (dirt--;
    line 29, change "6,004, 043" to --6,004,043--;
    line 30, change "0" to --θ--; and
    line 38, change "col." to --column--.

Col. 5, line 48, change "comer" to --corner--.

UNITED STATES PATENT AND TRADEMARK OFFICE
CERTIFICATE OF CORRECTION

PATENT NO. : 6,595,696 B1
APPLICATION NO. : 09/805198
DATED : July 22, 2003
INVENTOR(S) : Darren J. Zellak It is certified that error appears in the above-identified patent and that said Letters Patent is hereby corrected as shown below:

Column 8, In claim 17 line 10, after "backplate" insert --is--.

Column 8, In claim 18 line 11, after "comprising" delete --a--.

This certificate supersedes the Certificate of Correction issued May 6, 2008.

Signed and Sealed this

Twelfth Day of August, 2008

JON W. DUDAS
*Director of the United States Patent and Trademark Office*